(12) United States Patent
Maher et al.

(10) Patent No.: US 11,739,855 B2
(45) Date of Patent: Aug. 29, 2023

(54) DUAL COIL LOW PROFILE SOLENOID VALVE WITH ELECTRONIC INDICATION

(71) Applicant: CNH Industrial America LLC, New Holland, PA (US)

(72) Inventors: Ayoub Maher, Chicago, IL (US); Jerry Brinkley, Woodridge, IL (US); Michelle Sterrett, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 72 days.

(21) Appl. No.: 17/411,924

(22) Filed: Aug. 25, 2021

(65) Prior Publication Data

US 2023/0060833 A1 Mar. 2, 2023

(51) Int. Cl.
*F16K 31/06* (2006.01)
*F16K 31/10* (2006.01)

(52) U.S. Cl.
CPC ...... *F16K 31/0606* (2013.01); *F16K 31/0627* (2013.01); *F16K 31/10* (2013.01)

(58) Field of Classification Search
CPC ............ F16K 31/0606; F16K 31/0627; F16K 37/0008; F16K 31/10; F16K 31/105; F16K 31/0679; F16K 27/029; F16K 31/524; F16K 37/0083
See application file for complete search history.

(56) References Cited

U.S. PATENT DOCUMENTS

| | | | | |
|---|---|---|---|---|
| 586,740 A | * | 7/1897 | Knickerbacker | ... F16K 37/0008 116/277 |
| 802,955 A | * | 10/1905 | Waterman | ............... F16K 31/10 251/129.2 |
| 1,056,124 A | * | 3/1913 | Rorke et al. | ............ F16K 31/10 251/294 |
| 1,622,723 A | * | 3/1927 | Johnson | .................. F16K 31/10 251/355 |
| 2,196,120 A | * | 4/1940 | Arthurl | ................. F16K 11/161 251/129.1 |
| 2,605,785 A | * | 8/1952 | Ellsworth | ............... F16K 11/24 251/129.2 |
| 3,095,902 A | * | 7/1963 | Caton | ................. F16K 31/0679 251/363 |
| 3,236,494 A | | 2/1966 | Frantz | |
| 4,649,803 A | * | 3/1987 | Abel | ........................ F15B 9/03 91/363 R |
| 6,902,143 B2 | | 6/2005 | Domke et al. | |
| 8,353,310 B2 | | 1/2013 | Lin et al. | |
| 9,476,518 B2 | | 10/2016 | Blanchard et al. | |
| 10,088,054 B2 | | 10/2018 | Pelfrey et al. | |
| 10,788,056 B2 | | 9/2020 | Weingarten | |

FOREIGN PATENT DOCUMENTS

FR 2836187 A1 8/2003
KR 2013/0078305 A 7/2013

* cited by examiner

*Primary Examiner* — Umashankar Venkatesan

(74) *Attorney, Agent, or Firm* — Rickard DeMille; Rebecca Henkel

(57) ABSTRACT

Systems and apparatuses include a solenoid valve including a first coil, a second coil coupled to the first coil, a banjo fitting coupled to the second coil, a spool housing coupled to the banjo fitting so that the first coil and the second coil are selectively rotatable about the spool housing, a spool received within the spool housing, and an armature received within the first coil and the second coil and including a spool actuator coupled to the spool.

20 Claims, 8 Drawing Sheets

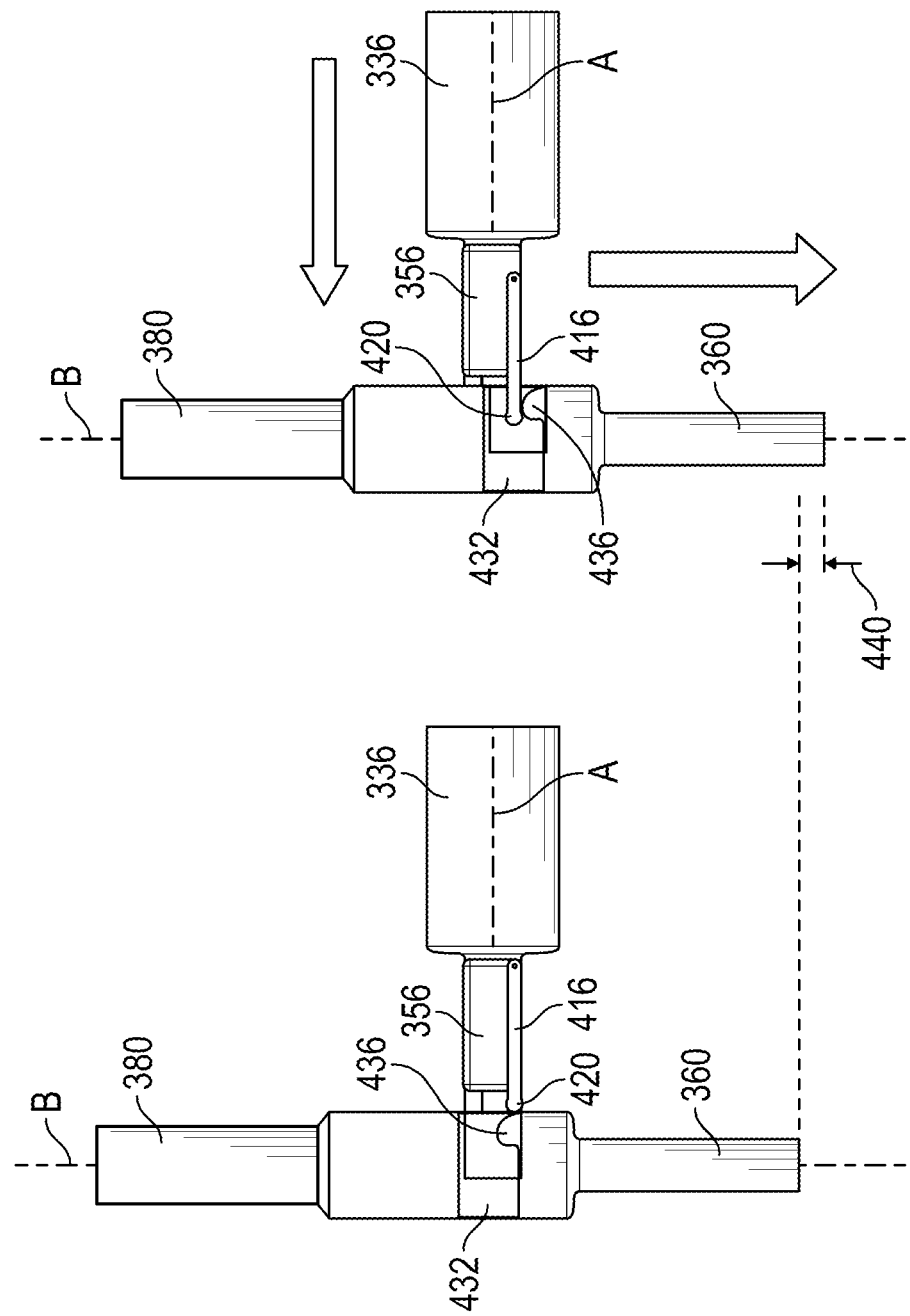

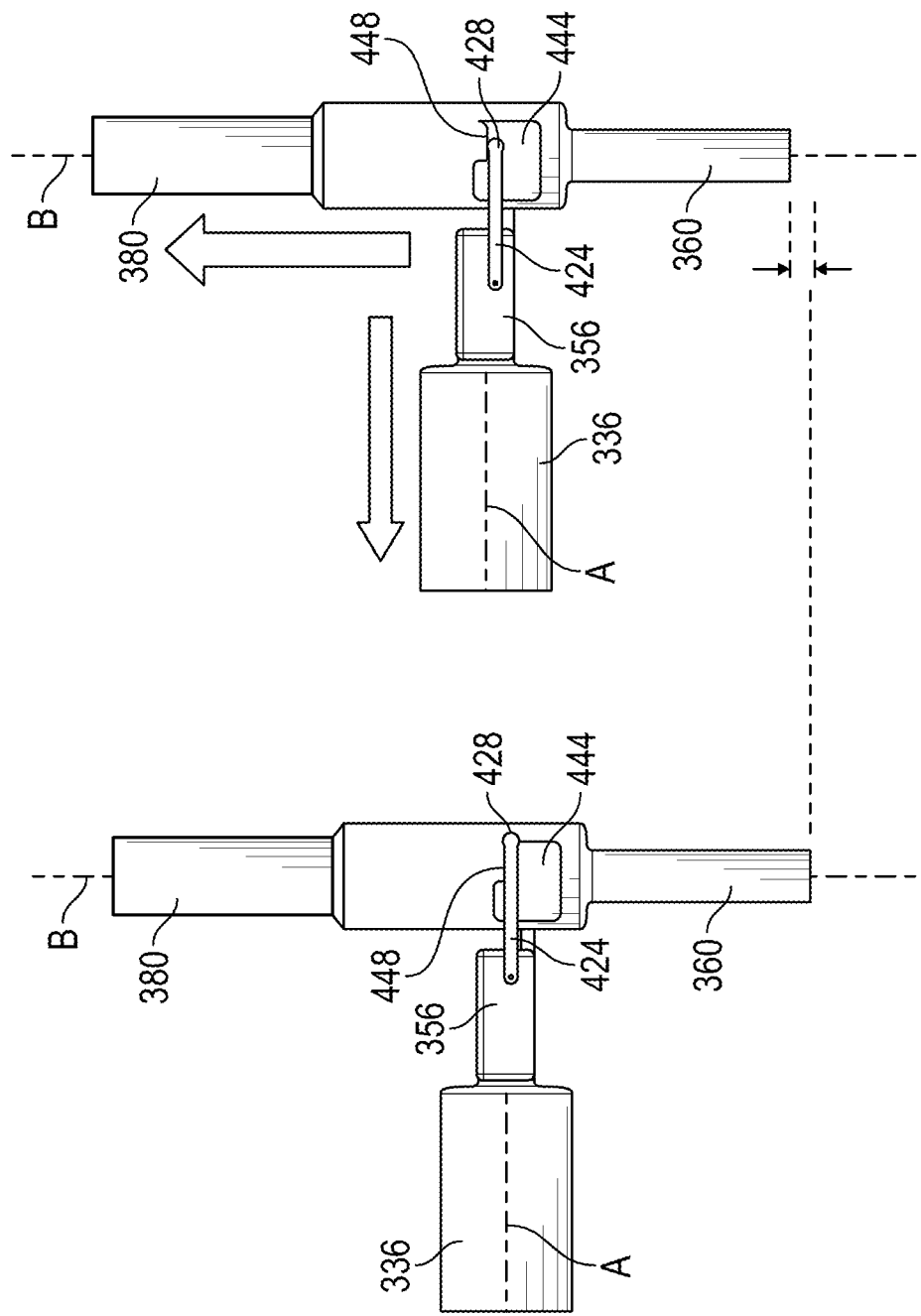

DUAL COIL LOW PROFILE SOLENOID VALVE WITH ELECTRONIC INDICATION

BACKGROUND

The present disclosure relates generally to solenoid valves. More specifically, the present disclosure relates to solenoid valves for actuating spool valves used in hydraulic systems.

SUMMARY

One embodiment relates to a solenoid valve. The solenoid valve includes a first coil, a second coil coupled to the first coil, a banjo fitting coupled to the second coil, a spool housing coupled to the banjo fitting so that the first coil and the second coil are selectively rotatable about the spool housing, a spool received within the spool housing, and an armature received within the first coil and the second coil and including a spool actuator coupled to the spool.

Another embodiment relates to a solenoid valve system. The solenoid valve system includes a solenoid valve including a first coil and a second coil positioned within a single solenoid housing, an armature received within the first coil and the second coil and defining an armature axis, a spool housing coupled to solenoid housing and defining a spool axis that is perpendicular to the armature axis, a spool received within the spool housing and including an indicator end, and a spool actuator coupled between the armature and the spool; and an indicator assembly including an indicator housing coupled to the spool housing, a switching element directly contacted by the spool, and a visual position indicator responsive to the switching element.

Still another embodiment relates to a method. The method includes energizing a first coil and compelling an armature to extend along an armature axis, energizing a second coil collocated with the first coil and compelling the armature to retract, actuating a spool to a first position along a spool axis that is perpendicular to the armature axis with a spool actuator coupled to the armature when the first coil is energized, actuating the spool to a second position along the spool axis with the spool actuator when the second coil is energized, rotating the first coil and the second coil about the spool axis relative to a spool housing, contacting a switching element with the spool, and visually indicating a spool position responsive to the switching element.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 10 is a left side view of a spool, an armature, and a spool actuator in a neutral spool position of the solenoid valve of FIG. 4, according to an exemplary embodiment.

FIG. 11 is a left side view of the spool, the armature, and the spool actuator in a first spool position of the solenoid valve of FIG. 4, according to an exemplary embodiment.

FIG. 12 is a right side view of the spool, the armature, and the spool actuator in the neutral spool position of the solenoid valve of FIG. 4, according to an exemplary embodiment.

FIG. 13 is a right side view of the spool, the armature, and the spool actuator in a second spool position of the solenoid valve of FIG. 4, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Many dual coiled solenoid valves are large and cumbersome when used in tractors and other industrial or agricultural machinery. Typical dual coil solenoid valves have a large space claim and get very easily damaged during shipment and in use because of their tall profile.

The solenoid systems discussed herein reduce space claim problems by providing a more compact dual coiled solenoid valve that provides a perpendicular actuation architecture, three-hundred-sixty degree variability of the solenoid position about a valve spool axis, a serviceable valve spool that can be replaced without replacing the entire valve assembly, changeable valve logic, a visual position indicator, and a standard industrial cavity mating system. Other advantages of the solenoids disclosed herein will be evident upon review of the specification and the claims that follow.

According to an exemplary embodiment, a solenoid valve of the present disclosure includes two coils positioned in a solenoid housing that actuate an armature between an extended position, a retracted position, and a neutral position between the extended position and the retracted position.

Overall Vehicle

Figure 1:
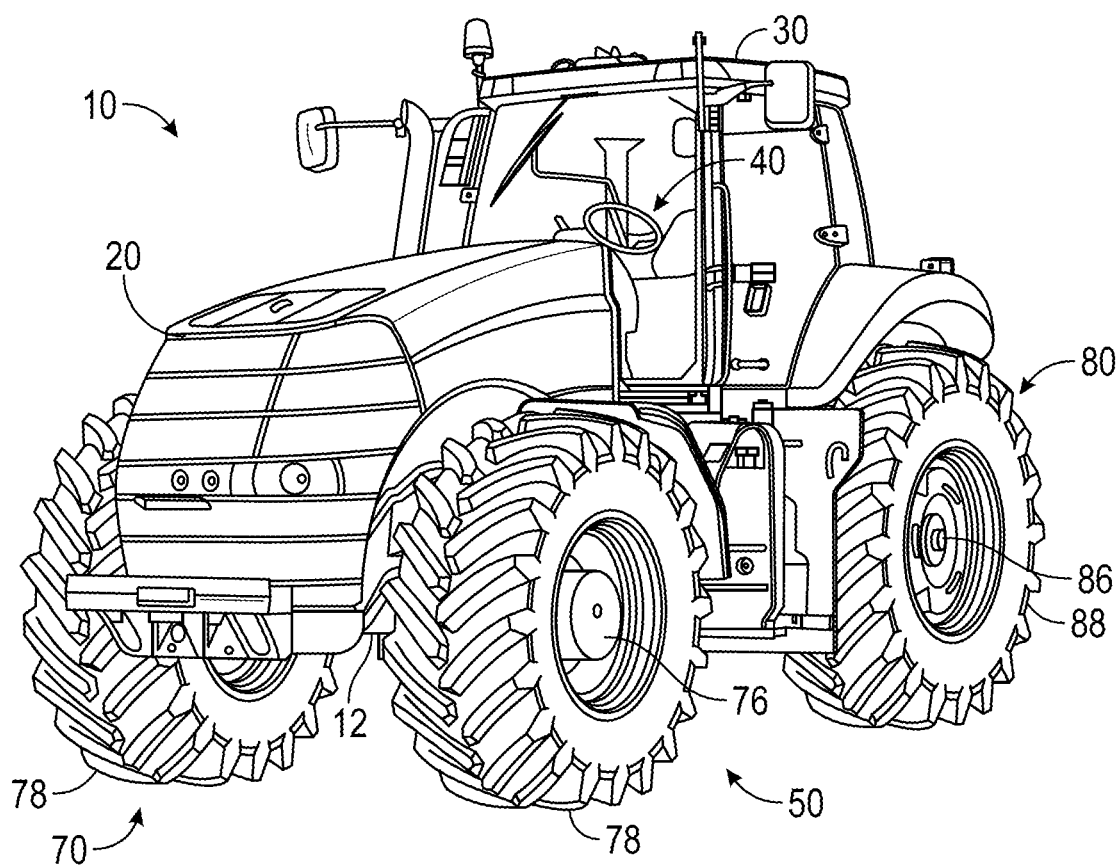
FIG. 1 is a perspective view of a vehicle, according to an exemplary embodiment.
Figure 2:
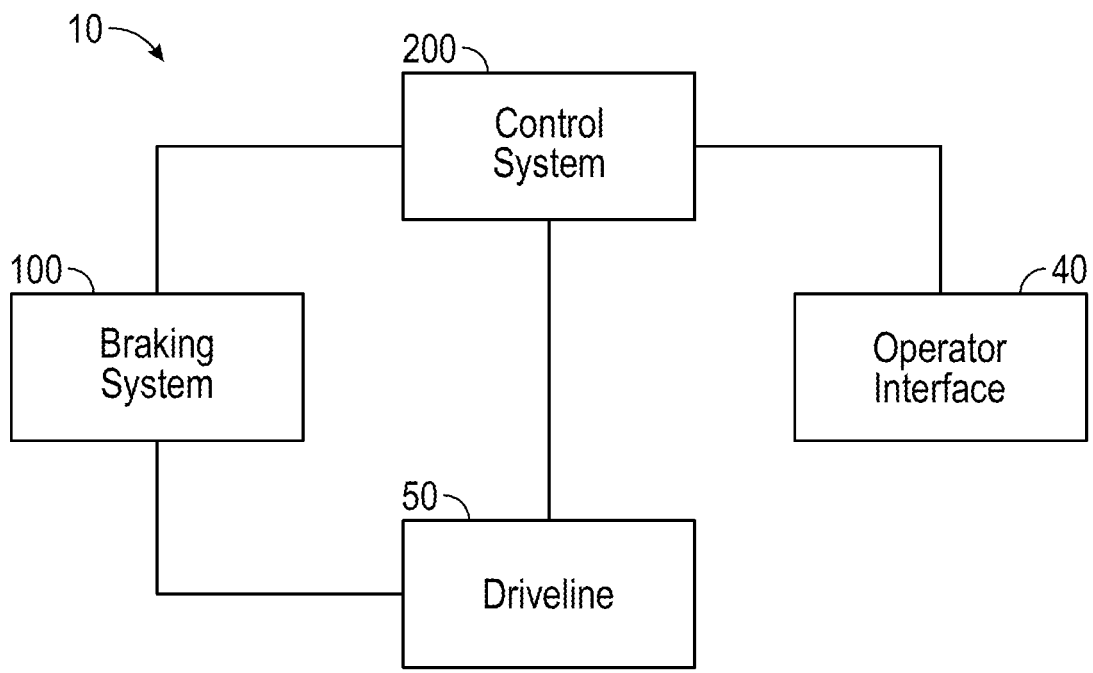
FIG. 2 is a schematic block diagram of the vehicle of FIG. 1, according to an exemplary embodiment.
Figure 3:
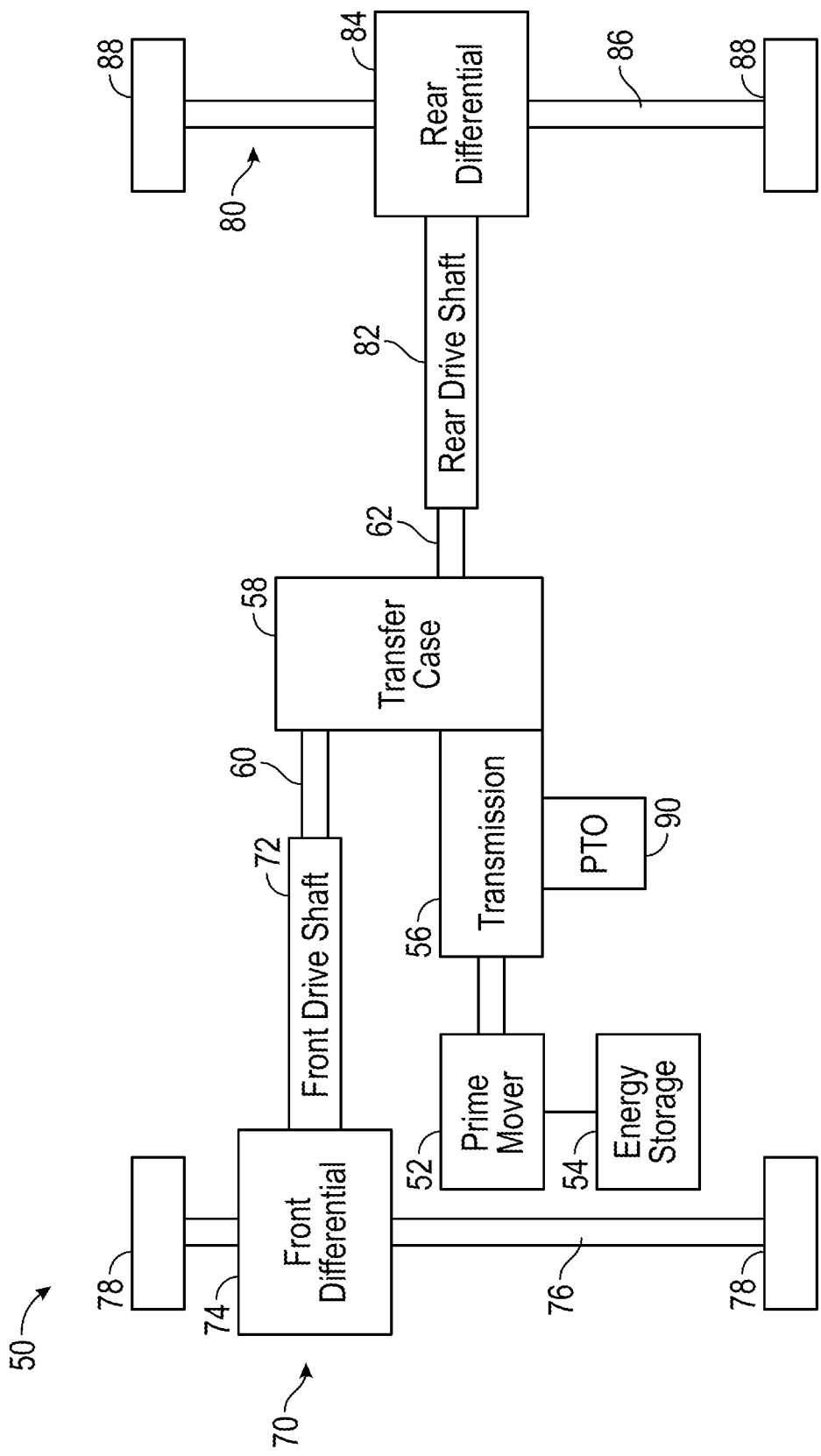
FIG. 3 is a schematic block diagram of a driveline of the vehicle of FIG. 1, according to an exemplary embodiment.

According to the exemplary embodiment shown in FIGS. 1-3, a dual coiled solenoid valves can be used with a machine or vehicle, shown as vehicle 10, that includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components. The dual coil solenoid valve can be used to control aspects of hydraulic systems of the vehicle 10. For example, the dual coil solenoid valve can be used to control attachments or implements of the vehicle 10, components of the driveline 50, the braking system 100, aspects of the control system 200, or other hydraulically actuated and/or controlled components, systems, and/or sub-systems.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Low Profile Solenoid Valve

Figure 4:
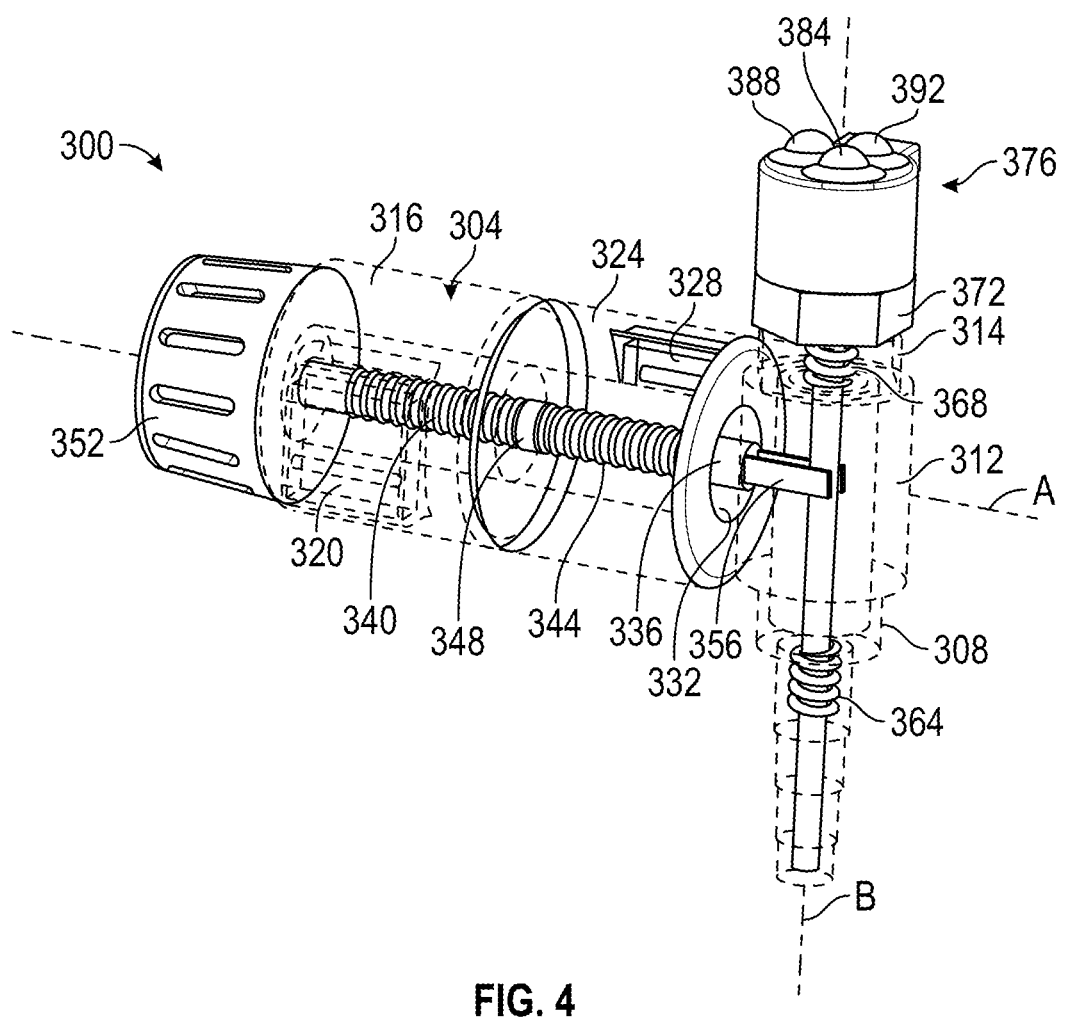
FIG. 4 is a perspective view of a solenoid valve system, according to an exemplary embodiment.
Figure 5:
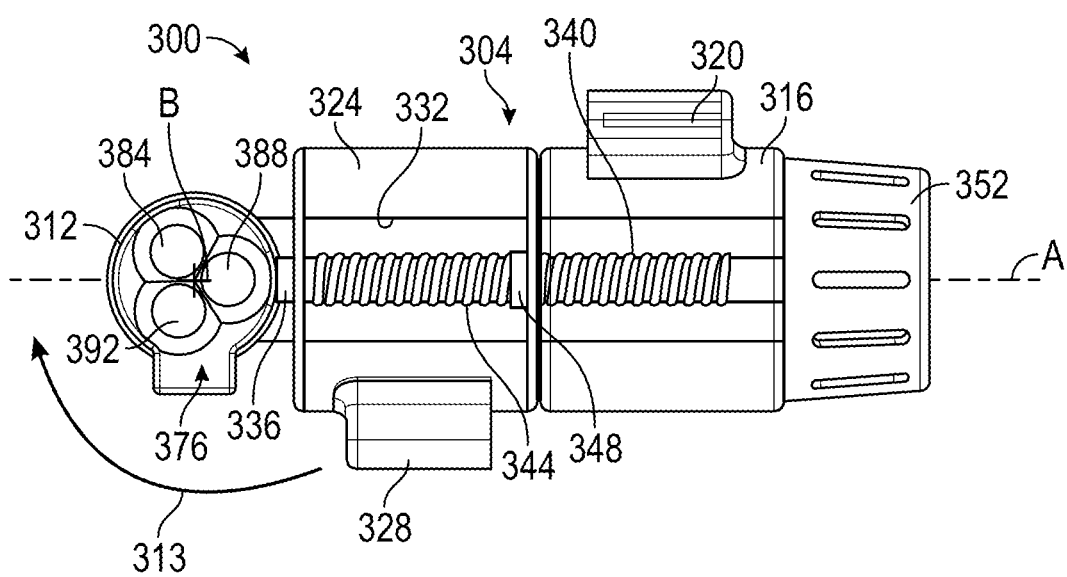
FIG. 5 is a top view of the solenoid valve system of FIG. 4, according to an exemplary embodiment.
Figure 6:
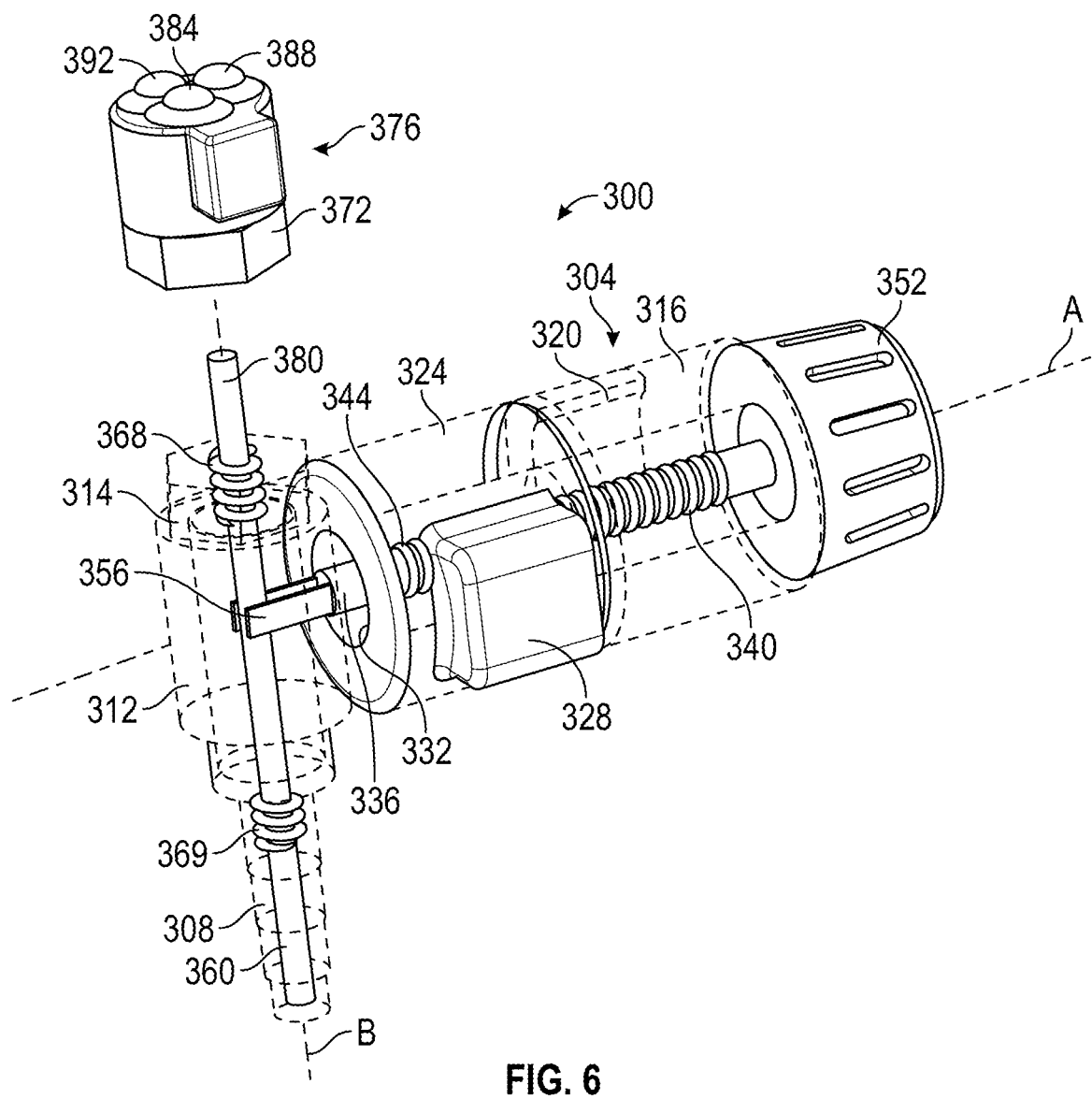
FIG. 6 is a partially exploded perspective view of the solenoid valve system of FIG. 4, according to an exemplary embodiment.

As shown in FIGS. 4-6, a duel coiled solenoid valve 300 includes a solenoid housing 304 coupled to a spool housing 308 with a rotatable fitting in the form of a banjo fitting 312. The solenoid housing 304 defines a solenoid housing axis A that is arranged perpendicular to a spool axis B defined by the spool housing 308. The banjo fitting 312 connects the solenoid housing 304 to the spool housing 308 so that the solenoid housing 304 can rotate about the spool axis B (as indicated by arrow 313 of FIG. 5) while maintaining the solenoid housing axis A perpendicular to the spool axis B. In some embodiments, the banjo fitting 312 includes a locking structure that inhibits the rotation of the solenoid housing 304 relative to the spool housing 308. For example, a lock screw, a locking collar, a thread locker, or another structure can be employed. In some embodiments, a mounting screw 314 is threadingly engaged with the banjo fitting 312 and locks the banjo fitting 312 in place.

The solenoid housing 304 includes a first coil section 316 that supports a first coil 320, and a second coil section 324 that supports a second coil 328. The solenoid housing 304 also defines an armature aperture 332 that extends through the first coil section 316 and the second coil section 324 along the solenoid housing axis A. The first coil section 316 is coupled directly to the second coil section 324. The second coil section 324 is coupled to the banjo fitting 312. Both the first coil section 316 and the second coil section 324 are on the same side of the banjo fitting 312 within the solenoid housing 304 and both the first coil section 316 and the second coil section 324 move together with the solenoid housing 304 about the spool axis B.

An armature 336 is positioned in the armature aperture 332 and is compelled to move between an extended position by the first coil 320 and a retracted position by the second coil 328. A neutral position is defined between the extended position and the retracted position. In some embodiments, the neutral position is centered between the extended positon and the retracted position. A first armature centering spring 340 is coupled between a ring 348 of the armature 336 and the first coil section 316 and biases the armature 336 toward the extended position. A second armature centering spring 344 is coupled between the ring 348 of the armature 336 and the second coil section 324 and biases the armature 336 toward the retracted position. The first armature centering spring 340 and the second armature centering spring 344 provide opposing biases and act to center the armature 336 to the neutral position. The first coil 320 compels the armature 336 to actuate to the extended position and overcomes the bias of the second armature centering spring 344. The second coil 328 compels the armature 336 to actuate to the retracted position and overcomes the bias of the first armature centering spring 340. A coil cap 352 is coupled to the first coil section 316.

A dual tabbed valve spool actuator 356 is connected to the armature 336 and moves therewith. The spool actuator 356 is structured to engage a spool 360 positioned in the spool housing 308 and move the spool 360 between a first spool position, a neutral spool position, and a second spool position. When the armature 336 is arranged in the extended position, the spool 360 is actuated to the first spool position by the spool actuator 356. When the armature 336 is arranged in the neutral position, the spool 360 is actuated to the neutral spool position by the spool actuator 356. When the armature 336 is arranged in the retracted position, the spool 360 is actuated to the second spool position by the spool actuator 356.

A first spool centering spring 364 is coupled between the spool 360 and the spool housing 308 and biases the spool toward the neutral spool position. A second spool centering spring 368 is coupled between the spool 360 and an indicator housing 372 and biases the spool toward the neutral spool position. The spool 360 provide a first spool flow when arranged in the first spool position, a second spool flow in the neutral spool position, and a third spool flow in the second spool position.

An indicator assembly 376 includes the indicator housing 372 that is coupled to the banjo fitting 312 or the spool housing 308 and is structured to receive an indicator end 380 (see FIG. 6) of the spool 360. The indicator assembly 376 also includes visual indicators in the form of a first position light 384, a second position light 388, and a neutral position light 392. In some embodiments, the visual indicators include LED lights, color coded lights, non-illuminated indicators, text indicators, pictoral indicators, icons, etc.

Figure 7:
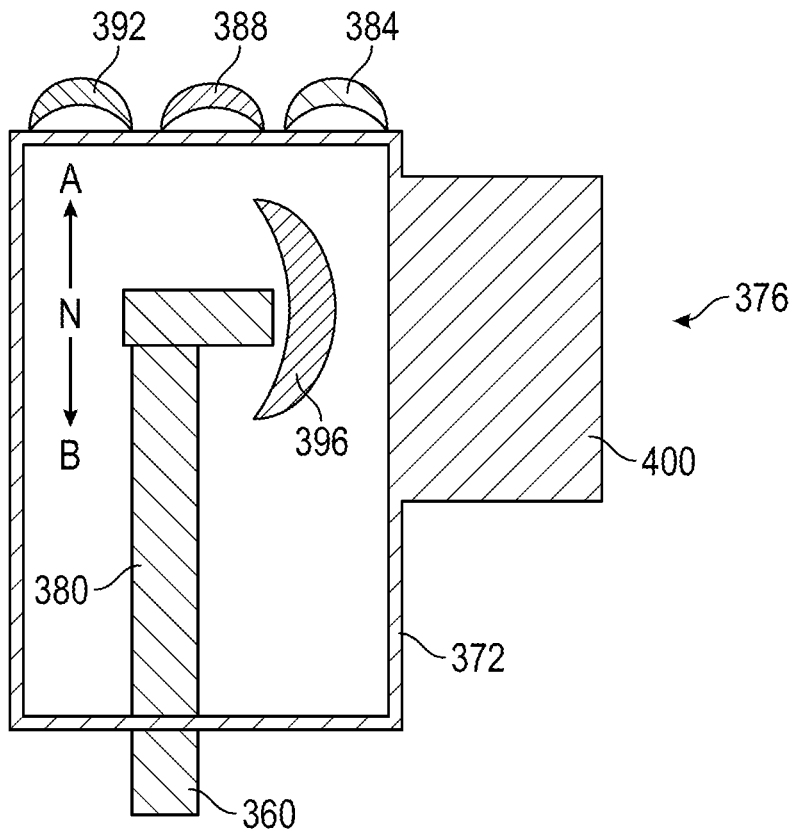
FIG. 7 is a schematic representation of an indicator assembly of the solenoid valve of FIG. 4, according to an exemplary embodiment.

As shown in FIG. 7, the indicator assembly 376 includes a three position switch element 396 positioned to be actuated by the indicator end 380 of the spool 360. In some embodiments, the indicator end 380 of the spool 360 includes a projection, an aperture, or another switch feature that engages the switch element 396. The switch element 396 has switch positions corresponding to the first spool position, the neutral spool position, and the second spool position. A controller 400 receives information from the switch element 396 and selectively actuates the indicators to visually represent the spool position. For example, when the spool 360 is in the first spool position, the indicator end 380 of the spool 360 extends into the indicator housing 372 and moves the switch element 396 to a first indication position (shown as A), and the first position light 384 is illuminated by the controller 400. When the spool 360 is in the neutral spool position, the indicator end 380 of the spool 360 extends into the indicator housing 372 and moves the switch element 396 to a neutral indication position (shown as N), and the neutral position light 392 is illuminated by the controller 400. When the spool 360 is in the second spool position, the indicator end 380 of the spool 360 extends into the indicator housing 372 and moves the switch element 396 to a second indication position (shown as B), and the second position light 388 is illuminated by the controller 400. In some embodiments, the controller includes an onboard battery housed within the indicator housing 372. In some embodiments, the indicator assembly 376 is power via wired connection. In some embodiments, the indicator assembly 376 transmits information from the controller including position information that may be used by one or more vehicle controllers.

Figure 8:
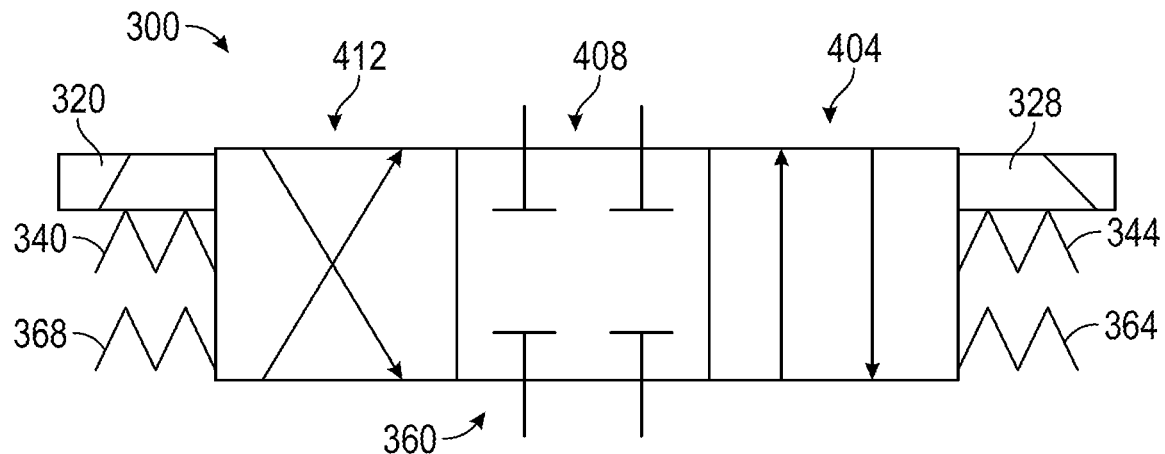
FIG. 8 is a schematic representation of the solenoid valve of FIG. 4, according to an exemplary embodiment.

As shown in FIG. 8, the spool 360 is a three position, four-way valve and defines the first spool position 404, the neutral spool position 408, and the second spool position 412. In some embodiments, the spool 360 and spool housing 308 define more than three spool positions or less than three spool position. In some embodiments, the spool 360 and spool housing 308 may define more flow paths (e.g., a six-way valve) or less flow paths (e.g., a two-way valve). The dual coiled solenoid valve 300 can be configured as any three-position, four-way valve. While the schematic depiction of the solenoid valve 300 shown in FIG. 8 represents the first coil 320 on a left side of the spool 360 and the second coil 328 on the right side of the spool 360, it should be noted that the physical arrangement of the solenoid valve includes both the first coil 320 and the second coil 328 colocated as shown in FIGS. 4-6.

Figure 9:
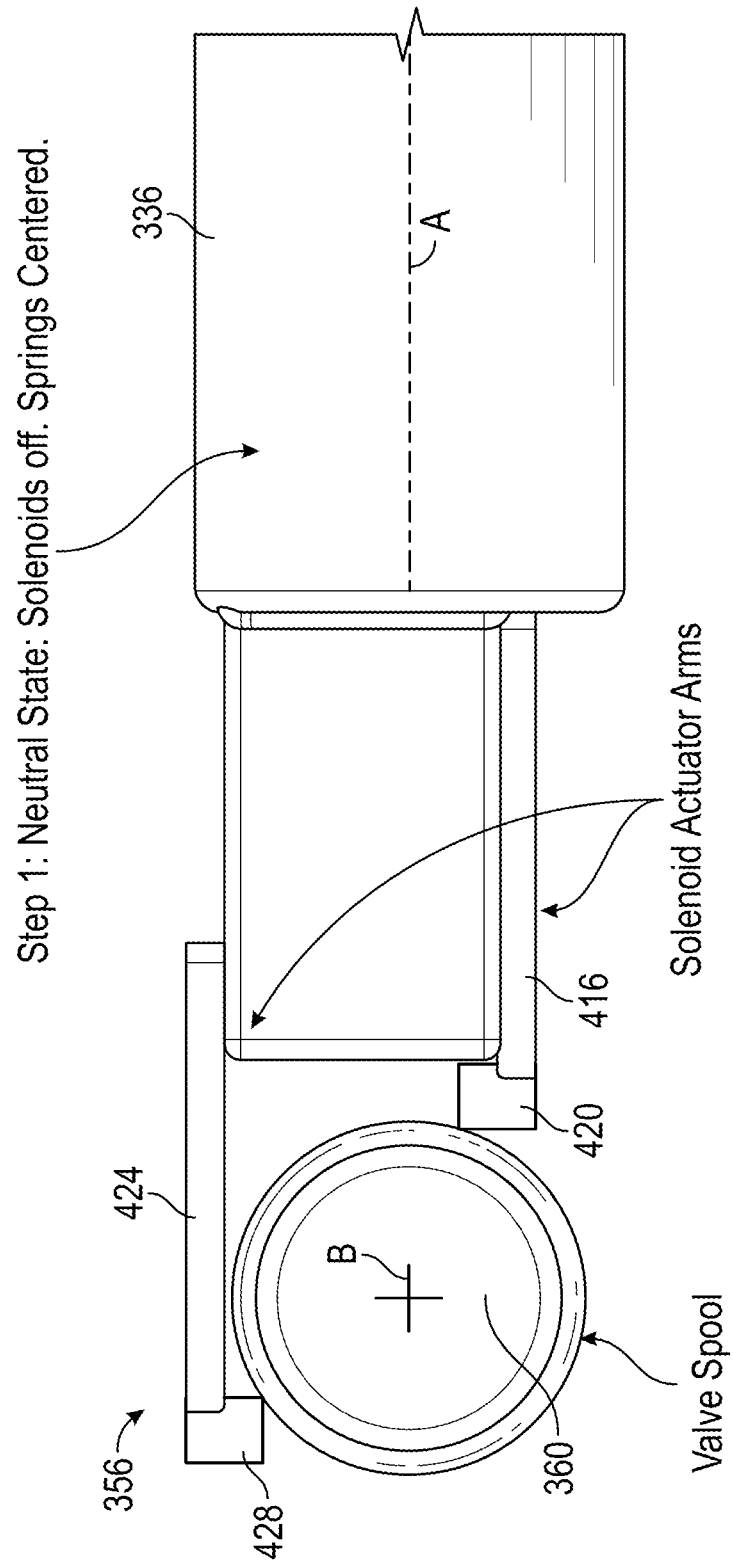
FIG. 9 is a sectional view of a spool, an armature, and a spool actuator of the solenoid valve of FIG. 4, according to an exemplary embodiment.

As shown in FIG. 9, the dual tabbed valve spool actuator 356 includes a first arm 416 and a first cam 420, and a second arm 424 and a second cam 428. The first cam 420 and the second cam 428 are structured to engage the spool 360 as the armature 336 moves linearly along the solenoid housing axis A.

As shown in FIG. 10, when the armature 336 is in the neutral position, the first cam 420 of the spool actuator 356 does not engage the spool 360 and the centering springs 364, 368 bias the spool 360 to the neutral spool position.

As shown in FIG. 11, when the armature 336 is moved to the extended position, the first cam 420 of the first arm 416 extends into a first spool actuation recess 432 and engages a first cam follower 436 formed on the spool 360 and the spool 360 is moved a first distance 440 to the first spool position.

As shown in FIG. 12, when the armature 336 is in the neutral position, the second cam 428 of the spool actuator 356 does not engage the spool 360 and the centering springs 364, 368 bias the spool 360 to the neutral spool position.

As shown in FIG. 13, when the armature 336 is moved to the retracted position, the second cam 428 of the second arm 424 is retracted into a second spool actuation recess 444 and engages a second cam follower 448 formed on the spool 360 and the spool 360 is moved a second distance 452 to the second spool position.

The solenoid valve 300 provides a valve spool 360 and a solenoid armature 336 that are arranged perpendicular to each other (e.g., at ninety degrees). In some embodiments, the solenoid valve 300 is sized to fit an SAE 10 4-port opening. The perpendicular arrangement allows the solenoid housing 304 of the solenoid valve 300 to be parallel to the solenoid valves 300 mounting surface, thereby giving it a low profile. The solenoid valve 300 provides 360 degree variability perpendicular to valve spool axis B. The valve spool 360 is serviceable and can be replaced without replacing the entire solenoid valve 300 like on most commercial cartridge valves. The valve spool 360 can be replaced and/or another spool can be installed without having to change the solenoid portion of the dual coiled solenoid valve 300. For example, the indicator assembly 376 and the mounting screw 314 can be removed, providing access to the spool 360. The ability to remove and replace the spool 360 allows the valve logic to be changed by swapping out a different valve spool 360 of another design. The direct contact of the indicator end 380 of the spool 360 with the indicator assembly 376 provides positive and accurate positional indication. The output of the indicator assembly could be used by a vehicle or machine controller for closed loop feedback.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. A solenoid valve, comprising:
a first coil;
a second coil coupled to the first coil;
a banjo fitting coupled to the second coil;
a spool housing coupled to the banjo fitting so that the first coil and the second coil are selectively rotatable about the spool housing;
a spool received within the spool housing;
an armature received within the first coil and the second coil and including a spool actuator coupled to the spool; and
an indicator assembly including a switching element directly contacted by the spool.

2. The solenoid valve of claim 1, wherein the switching element is a three position switching element.

3. The solenoid valve of claim 1, wherein the indicator assembly includes a visual position indicator.

4. The solenoid valve of claim 3, wherein the visual position indicator includes lights.

5. The solenoid valve of claim 1, wherein the spool actuator includes two arms that extend from the armature.

6. The solenoid valve of claim 1, wherein the spool actuator includes a cam, and wherein the spool includes a cam follower that engages the cam to move the spool.

7. The solenoid valve of claim 1, further comprising a centering spring that biases the armature toward a neutral position.

8. The solenoid valve of claim 1, further comprising a centering spring that biases the spool toward a neutral position.

9. The solenoid valve of claim 1, wherein the first coil and the second coil are positioned in a single solenoid housing.

10. The solenoid valve of claim 1, further comprising a first armature centering spring that biases the armature toward an extended position; and
a second armature centering spring that biases the armature toward a retracted position.

11. The solenoid valve of claim 1, further comprising a first spool centering spring that biases the spool toward a first position; and
a second spool centering spring that biases the spool toward a second position.

12. The solenoid valve of claim 1, wherein the spool is removable from the spool housing without removal of the first coil and the second coil.

13. The solenoid valve of claim 1,
wherein the spool actuator includes a first arm and a first cam, and a second arm and a second cam, and
wherein the spool defines a first actuator recess and a first cam follower, and a second actuator recess and a second cam follower.

14. The solenoid valve of claim 13, wherein the spool is captured between the first arm and the second arm.

15. A solenoid valve comprising:
a first coil;
a second coil coupled to the first coil;
a banjo fitting coupled to the second coil;
a spool housing coupled to the banjo fitting so that the first coil and the second coil are selectively rotatable about the spool housing;
a spool received within the spool housing; and
an armature received within the first coil and the second coil and including a spool actuator coupled to the spool,
wherein the spool actuator includes a first arm and a first cam, and a second arm and a second cam, and
wherein the spool defines a first actuator recess and a first cam follower, and a second actuator recess and a second cam follower.

16. The solenoid valve of claim 15, wherein the spool is captured between the first arm and the second arm.

17. A solenoid valve system comprising:
a solenoid valve including
a first coil and a second coil positioned within a single solenoid housing,
an armature received within the first coil and the second coil and defining an armature axis,
a spool housing coupled to solenoid housing and defining a spool axis that is perpendicular to the armature axis, wherein the solenoid housing is rotatable about the spool axis relative to the spool housing,
a spool received within the spool housing and including an indicator end, and
a spool actuator coupled between the armature and the spool; and
an indicator assembly including
an indicator housing coupled to the spool housing,
a switching element directly contacted by the spool, and
a visual position indicator responsive to the switching element.

18. The solenoid valve system of claim 17, wherein the spool actuator includes a first arm extending from the armature and a first cam, and a second arm extending from the armature and a second cam, and
wherein the spool defines a first actuator recess and a first cam follower, and a second actuator recess and a second cam follower.

19. A method comprising:
energizing a first coil and compelling an armature to extend along an armature axis;
energizing a second coil collocated with the first coil and compelling the armature to retract;
actuating a spool to a first position along a spool axis that is perpendicular to the armature axis with a spool actuator coupled to the armature when the first coil is energized;
actuating the spool to a second position along the spool axis with the spool actuator when the second coil is energized;
rotating the first coil and the second coil about the spool axis relative to a spool housing;
contacting a switching element with the spool; and
visually indicating a spool position responsive to the switching element.

20. The method of claim 19, wherein actuating the spool to the first position includes moving a first cam follower of the spool with a first cam of the spool actuator, and
wherein actuating the spool to the second position includes moving a second cam follower of the spool with a second cam of the spool actuator.

* * * * *